Oct. 31, 1950     A. R. ELLIS     2,527,534
CIRCULAR KNITTING MACHINE

Filed Oct. 23, 1947     14 Sheets-Sheet 1

INVENTOR
A.R. ELLIS

Oct. 31, 1950     A. R. ELLIS     2,527,534
CIRCULAR KNITTING MACHINE
Filed Oct. 23, 1947     14 Sheets-Sheet 2

INVENTOR
A.R. ELLIS
BY Featherstonhaugh & Co.
ATTORNEYS

Oct. 31, 1950     A. R. ELLIS     2,527,534
CIRCULAR KNITTING MACHINE
Filed Oct. 23, 1947     14 Sheets-Sheet 3

INVENTOR
A. R. ELLIS
BY Fetherstonhaugh & Co.
ATTORNEYS

Oct. 31, 1950     A. R. ELLIS     2,527,534
CIRCULAR KNITTING MACHINE

Filed Oct. 23, 1947     14 Sheets-Sheet 5

INVENTOR
A. R. ELLIS
BY Fetherstonhaugh & Co.
ATTORNEYS

Oct. 31, 1950        A. R. ELLIS        2,527,534

CIRCULAR KNITTING MACHINE

Filed Oct. 23, 1947        14 Sheets-Sheet 6

INVENTOR
A.R.ELLIS
BY Featherstonhaugh & Co.
ATTORNEYS

Oct. 31, 1950   A. R. ELLIS   2,527,534
CIRCULAR KNITTING MACHINE
Filed Oct. 23, 1947   14 Sheets-Sheet 7
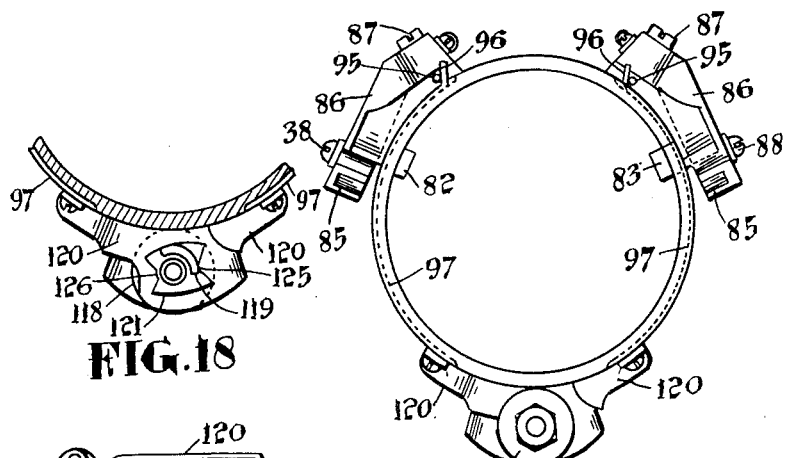
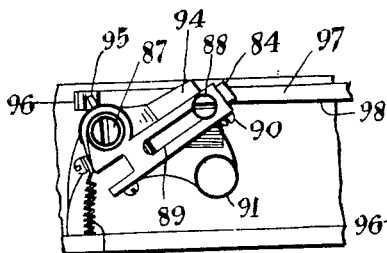
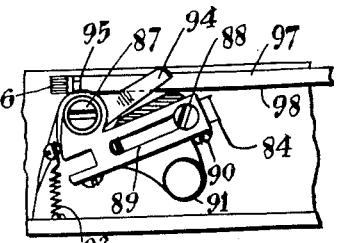
INVENTOR
A. R. ELLIS
Featherstonhaugh & Co.
ATTORNEYS Oct. 31, 1950     A. R. ELLIS     2,527,534
CIRCULAR KNITTING MACHINE Filed Oct. 23, 1947     14 Sheets—Sheet 8

INVENTOR
A.R. ELLIS
BY Featherstonhaugh & Co.
ATTORNEYS

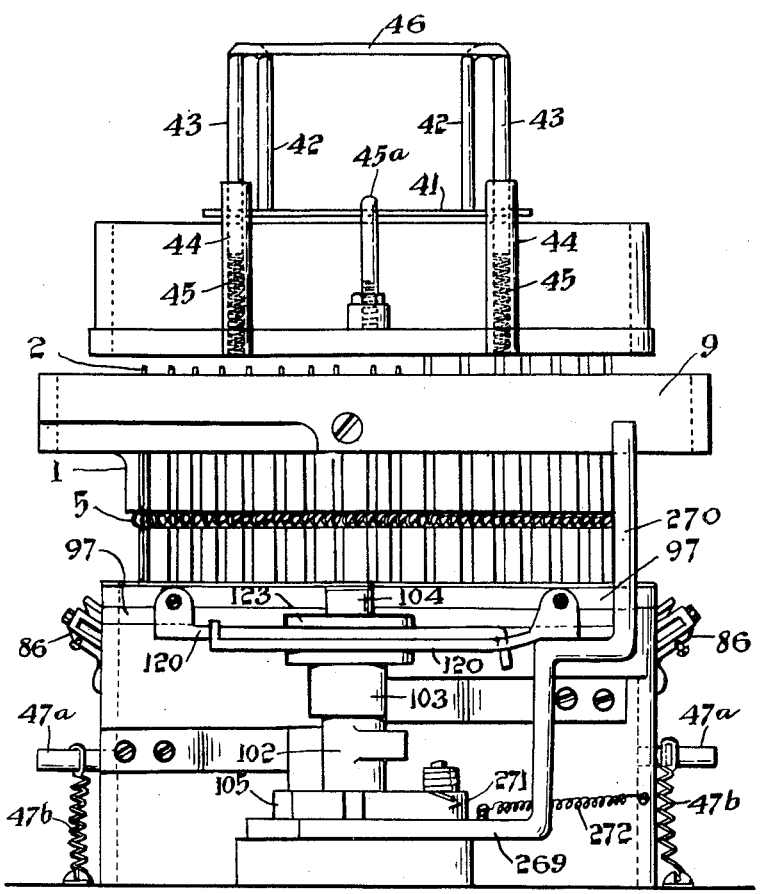
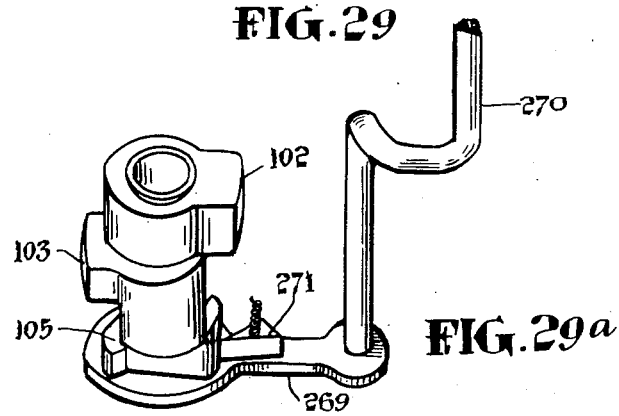

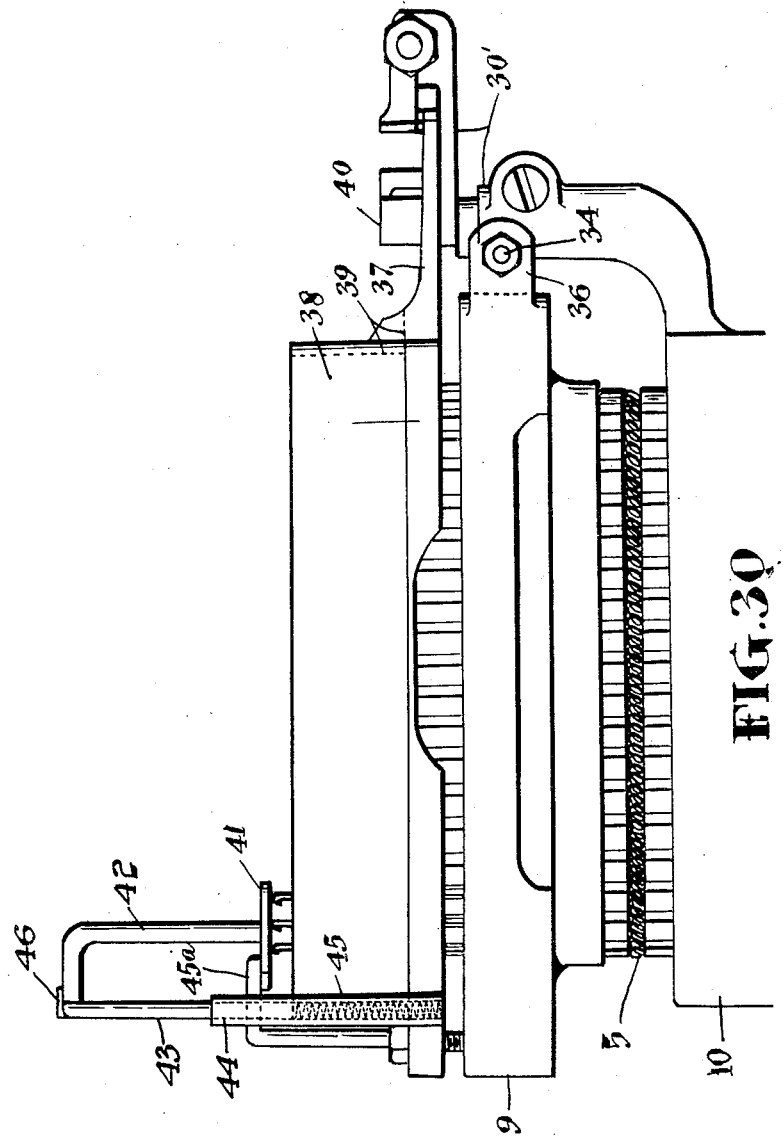

Oct. 31, 1950     A. R. ELLIS     2,527,534
CIRCULAR KNITTING MACHINE

Filed Oct. 23, 1947     14 Sheets-Sheet 12

INVENTOR
A.R.ELLIS
BY Fetherstonhaugh & Co.
ATTORNEYS

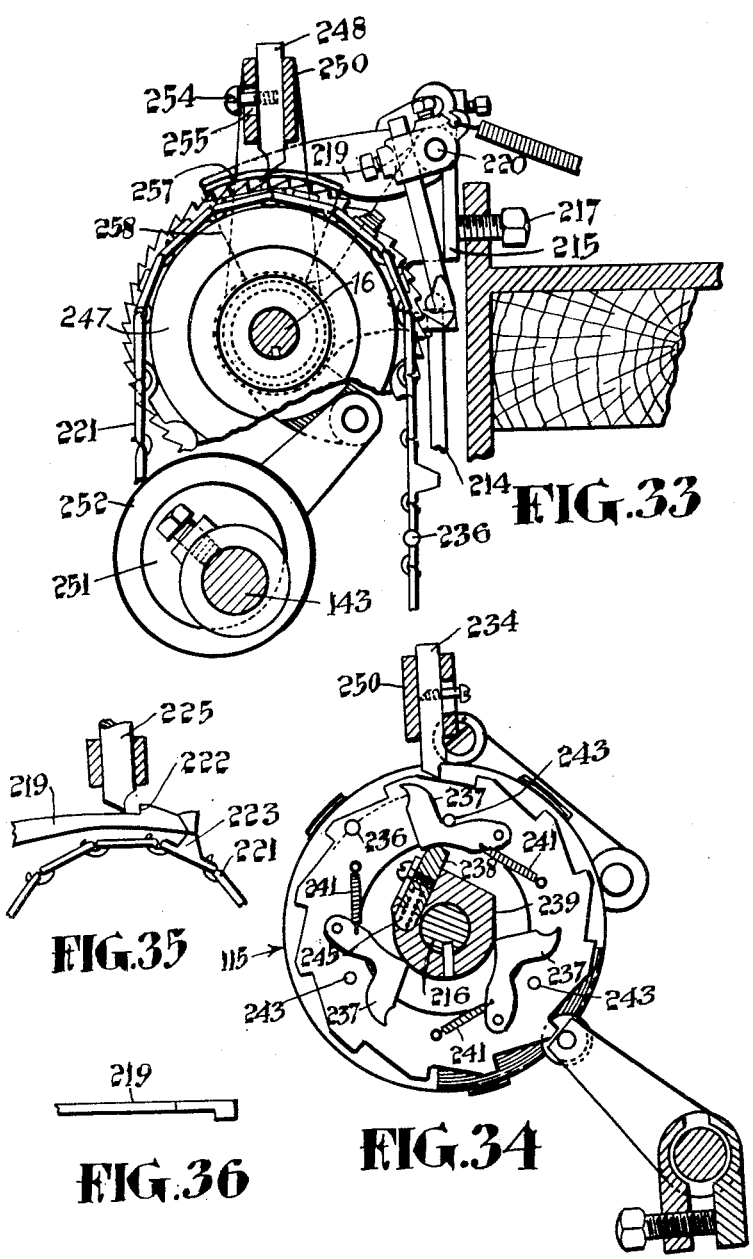

Oct. 31, 1950 A. R. ELLIS 2,527,534
CIRCULAR KNITTING MACHINE
Filed Oct. 23, 1947 14 Sheets-Sheet 14

INVENTOR
A. R. ELLIS
BY Featherstonhaugh & Co.
ATTORNEYS

Patented Oct. 31, 1950

2,527,534

UNITED STATES PATENT OFFICE 2,527,534

CIRCULAR KNITTING MACHINE

Albert Roy Ellis, Moncton, New Brunswick, Canada

Application October 23, 1947, Serial No. 781,590

7 Claims. (Cl. 66—47)

This invention relates to circular knitting machines used in the manufacture of stockings and half-hose.

The object of the invention is to provide an improved knitting machine of the character described which may be used as a fully automatic knitting machine for knitting stockings or half-hose with plain leg portions or may be used as a semi-automatic machine for making diamond patterns, during the knitting of the leg portions.

In the present instance, the improvements provided by the invention will be described as embodied in a known type of knitting machine embodying features set forth in U. S. Patent 570,059, dated October 27, 1896, and U. S. Patent 806,921, dated December 12, 1905.

A preferred embodiment of the invention is shown in the accompanying drawings, in which—

Figs. 11 to 28 inclusive are views showing details of the cam operating mechanism provided for operating the narrowing and widening cams and the throw-in and throw-out cams.

Fig. 29 is an enlarged elevational view of the knitting head assembly.

Fig. 29a is a detail view showing manually operable means for actuating the narrowing and widening cams during pattern knitting.

Fig. 30 is a side elevation of the upper part of the knitting head, and shows a ring guard carrying a needle depressing plate which is used during pattern-knitting.

Figure 31:
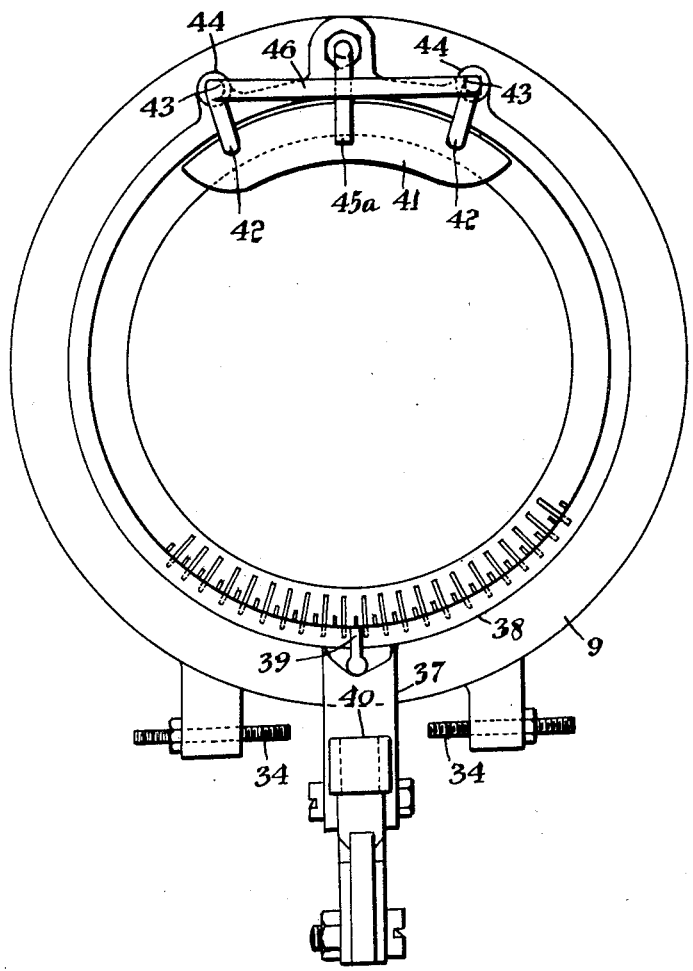

Fig. 31 is a plan view of the ring guard and needle depressing plate shown in Fig. 30.

Figure 32:
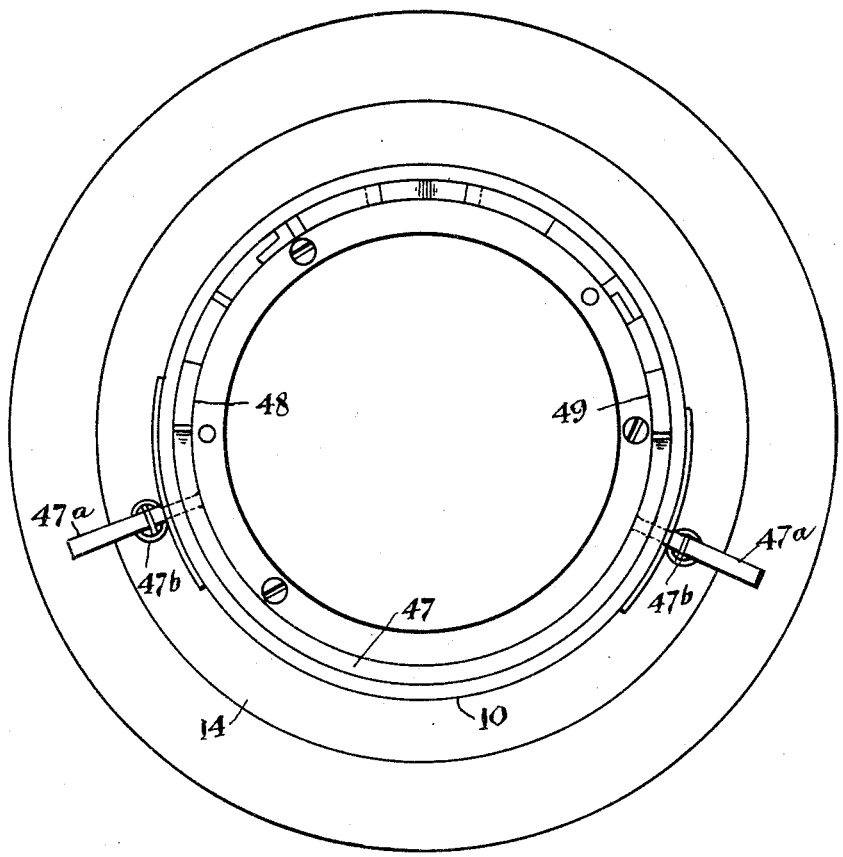

Fig. 32 is a plan view of the cam cylinder showing a vertically moveable needle raising rib used for lifting certain of the needles out of action during pattern knitting.

Figs. 33 to 36 inclusive are views showing details of the main cam disk and its operating mechanism including a pattern chain.

Figure 37:
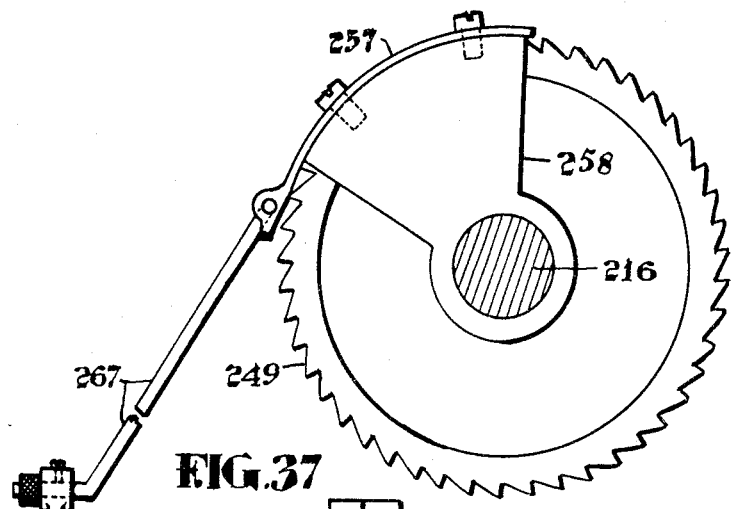

Fig. 37 is a side view showing a ratchet wheel shielding arrangement which functions to prevent operation of the pattern-chain when the machine is being used in pattern-knitting to form the leg portion with diamond patterns.

Figure 38:
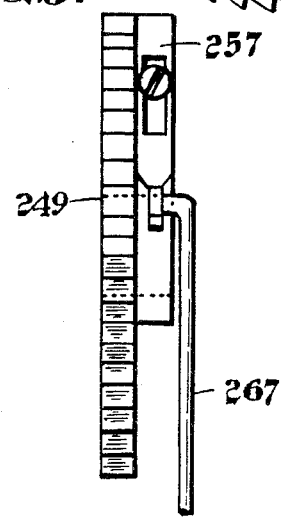

Fig. 38 is an edge elevation of the arrangement shown in Fig. 37.

Figure 39:
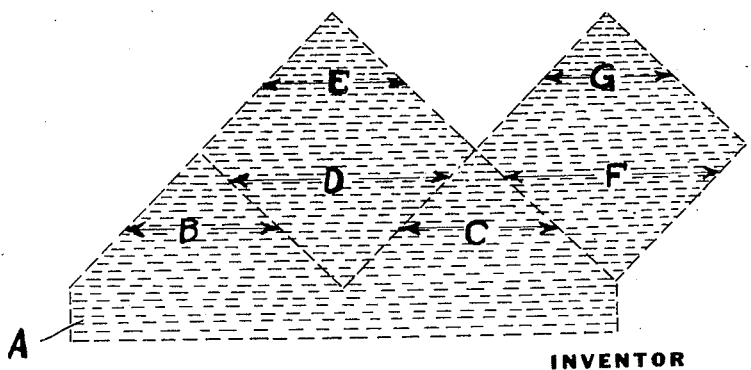

Fig. 39 is a diagram illustrating the sequence of the narrowing and widening operations performed by the machine during pattern knitting of the leg portion.

*The needle cylinder and cam cylinder assembly*

The needle cylinder 1 (see Figs. 2, 3, and 7) is provided with vertical grooves in which the needles 2 are guided. One half of the needles are provided with relatively long butts 3, and the other half with relatively short butts 4. The needles are held in the grooves by the usual spring bands 5. The sinkers 7 are supported and guided by the usual sinker ring 8 secured to the needle cylinder and are operated by the sinker cam-ring 9.

The needle cylinder is removably supported in place within the cam cylinder 10 which carries the needle actuating devices hereinafter described. Cam cylinder 10 is mounted on base plate 11 by a supporting flange 12 held in a recess 13 by retaining ring 14.

The needle cylinder is supported on the inwardly directed flange 15 of a cup-ring 16 arranged within a cylindrical casing 17 extending downwardly from base plate 11. Pins 18 project upwardly from cup ring flange 15 into sockets 19 provided in the lower end of the needle cylinder and hold the latter against turning relative to the cup-ring.

The cup-ring is provided with lugs 20 extending outwardly through slots 21 in casing 17. Springs 22 are interposed between the lugs 20 and the base plate 11 and serve to hold the cup-ring down upon an adjusting ring 23 arranged in the lower portion of casing 17. The cup-ring is split so that it may be contracted into clamping engagement with the needle cylinder by a cup-ring contracting rod 24 equipped with a handle 25.

Adjusting ring 23 is provided with spiral cam grooves 28 engaged by supporting rollers 29

(Figs. 3 and 7) mounted on casing 17. An operating rod 30 projects laterally from a plate 31 adjustably secured to the bottom of adjusting ring 23. When rod 30 is turned by hand or automatically the adjusting ring 23, cup-ring 16 and needle cylinder 1 are shifted vertically to vary the length of the stitches drawn by the needles.

Cam cylinder 10 (Figs. 2, 30 and 31) drives sinker cam ring 9 through the agency of a bracket 30' which extends upwardly from the cam cylinder and engages adjustable abutments afforded by screw rods 34 threaded through lugs 36 carried by the sinker cam ring.

The arm 37 of a guard ring 38 is pivoted to the upper end of cam cylinder bracket 30'. Guard ring 38 is provided with a slotted thread-guide 39 in line with a slotted guide-eye 40 on arm 37.

Guard ring 38 also carries a vertically movable needle depressing plate 41 (Figs. 2, 29, 30 and 31). This plate is fastened to the lower ends of two supporting rods 42 having their upper ends curved outwardly over guard 38 and secured to the upper extremities of a pair of guide rods 43. The lower portions of guide rods 43 are guided in guide cylinders 44 secured to the outer surface of guard 38 and are normally urged upwardly by springs 45 interposed between the guide rods and the lower ends of the cylinders. The upper ends of guide rods 43 are connected by cross bar 46 which provides a convenient handle means for depressing plate 41 against the resistance of springs 45. A stop 45a limits the upward movement of plate 41.

The knitting cams

Cam cylinder 10 is provided with a levelling rib on which the butts of the needles rest when the needles are in their lowermost position. This levelling rib (see Figs. 3, 9, 10, 29 and 32) consists of a vertically movable rib section 47 and two fixed rib sections 48 and 49. Rib section 47 extends around one-half the inner circumference of cam cylinder 10 and is provided, near its ends with lifting pins 47a extending outwardly through slots in the cam cylinder. Springs 47b are connected to the pins 47a and to the cam cylinder retaining ring 14 and normally serve to yieldingly hold rib section 47 down on a supporting ledge 53. When rib section 47 is resting on ledge 53 its upper surface is flush with the upper surfaces of rib sections 48 and 49 and its end edges are practically butted against the adjacent end edges of rib sections 48 and 49.

The remaining ends of rib sections 48 and 49 (Figs. 9 and 10) are separated from each other by interposed knitting cam elements including bevelled cam plates 50 and an inverted V-shaped cam plate 51. Fixed cam plates 52 and 53 are located above the bevelled ends 54 of cam plates 50 and are provided with recesses 55 and 56 to receive the narrowing cams hereinafter referred to. Pivoted switch cams 57 and 58 are arranged at the outer sides of cam plates 55 and 56 and normally rest on the upper portions of the bevelled ends 54 of cam plates 50.

Fixed guard cams 59 and 60 are positioned above the switch cams 57 and 58 so that they overlie the outer side portions of cams 52 and 53. An automatic pivoted switch cam 61 is interposed between the cams 52 and 53 and lies beneath a guard cam 62.

Figure 9:
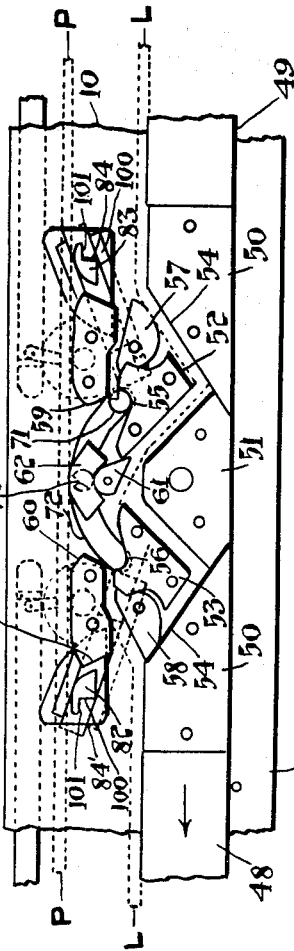
Fig. 9 is a development of the inside of the cam cylinder showing the knitting, narrowing and widening cams.
Figure 11:
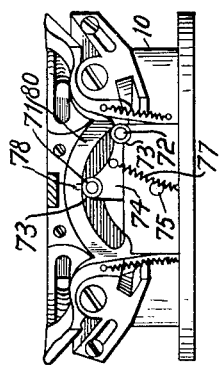
Figure 12:
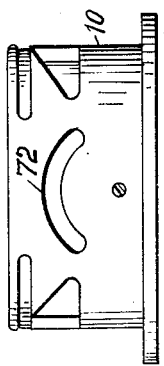
Figure 26:
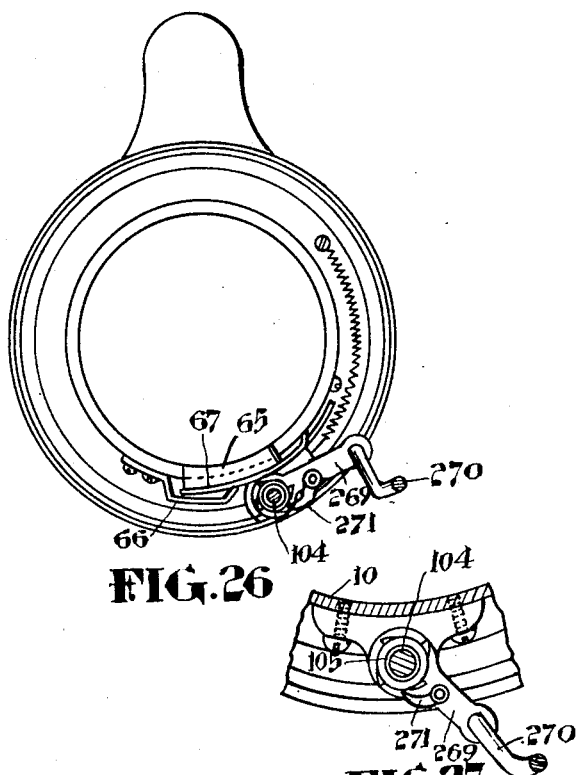
Figure 27:
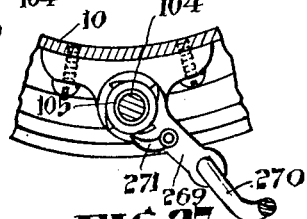
Figure 28:
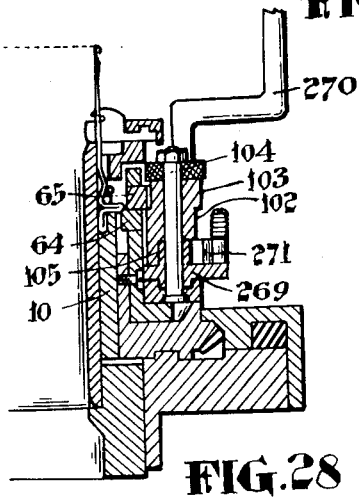

When cam cylinder 10 is turning forwardly during either rotary or reciprocating knitting the previously described knitting cam elements are positioned as shown in Fig. 9 and the needle butts travel over the cams 58 and 53 and under the cams 52 and 57, as indicated by dotted lines L. When the motion of the cam cylinder is reversed in reciprocating knitting the needle-butts travel over the cams 57 and 52 and under the cams 53 and 58.

Mechanism for throwing the needles into and out of operation during reciprocating heel and toe knitting When knitting plain stockings the cam cylinder is rotated during knitting of the leg and foot portions and is reciprocated during knitting of the heel and toe portions. About one-half of the needles (the long butt needles) are thrown out of action of the beginning of reciprocating heel and toe knitting and are returned to action when the reciprocating knitting is completed. This is accomplished through the agency of two oppositely inclined cams 64 and 65 working in slots in a portion of the cam cylinder located opposite the knitting cams. The cams 64 and 65 are carried by the free ends of spring arms 66 and 67 (Figs. 26 and 29) having their other ends secured to the outer surface of the cam cylinder. Cams 64 and 65 are normally held in a retracted position by spring arms 66 and 67 so that the inner faces of the cams are flush with the inner face of the cam cylinder.

At the beginning of reciprocating heel or toe knitting the throw-out cam 64 is projected inwardly beyond the inner face of the cam cylinder a limited distance so that it engages the butts 3 of the long butt needles 1 but does not engage the butts 4 of the short butt needles. In the operative or inwardly projected position of cam 64 the long butts 3 riding along the levelling rib (rib sections 47, 48 and 49) are caused to ascend the inclined face 64a of cam 64 and thus lift the long butt needles out of action, the short needle butts being permitted to continue along the levelling rib to the knitting cams.

At the completion of reciprocating heel or toe knitting the throw-out cam 64 is retracted to its normal inoperative position flush with the inner face of the cam cylinder and the throw-in cam 65 is projected a sufficient distance inwardly beyond the inner face of the cam cylinder to engage the butts 3 and 4 of all the needles which are in the upper or non-knitting position. In the operative or inwardly projected position of cam 65 the long and short butts 3 and 4 of all the needles in the raised or non-knitting position are caused to descend along the inclined face 65a of cam 65 and are thus returned to action.

Narrowing and widening

The fabric is narrowed during the first half of the reciprocating heel or toe knitting by gradually decreasing the number of active needles and is widened during the last half of the reciprocating knitting by gradually returning to action the needles rendered inactive during the narrowing operation. This is accomplished by the narrowing and widening mechanisms hereinafter described.

The narrowing mechanism

Automatic narrowing cams 70 and 71 (Figs. 9 to 15) project inwardly through a curved slot 72 in cam cylinder 10. This slot extends from recess 55 of knitting cam 52 to recess 56 of knitting cam 53. The intermediate portion of slot 72 lies directly opposite guard cam 62.

The narrowing cams are slidably mounted in slotted bearings 73 provided at the upper corners of a triangular plate 74 located outside cam cylinder 10. The lower corner of plate 74 is pivoted, at 75, to a plate 76 carried by the cam cylinder. A spring 77 is connected between plate 76 and cam cylinder 10 to yieldingly hold said plate in either of the limit positions to which said plate is swingable about its pivotal axis.

As here shown each narrowing cam consists of a pin having a notched needle-engaging end which is long enough to pick up both the long and short needle butts when the cam is thrown into operation. Each narrowing cam is also provided with a projection 78 extending upwardly through a slot in the bearing 73 and into the cam groove 79 of a cam plate 80 secured to the outer face of the cam cylinder above slot 72.

During rotary knitting of the leg or foot portion of the stocking the narrowing cams are positioned as shown in Fig. 9 the narrowing cam 70 being positioned behind guard cam 62 and the narrowing cam 71 being positioned in the recess 55 of knitting cam 52. In this position, the narrowing cams are inoperative since they lie out of the path of the needle butts which are then travelling over the cams 58 and 53 and under the cams 52 and 57.

When changing from rotary to reciprocating heel or toe knitting the forward motion of cam cylinder 10 is reversed and the previously mentioned cam 64 is projected into the cam cylinder to raise the long butt needles to a non-knitting position. During the initial reverse motion of the cam cylinder the pivoted switch cam 57 drops down into the underlying cam 50 so that the short needle butts are guided to travel over knitting cams 57 and 52 and under the cams 53 and 58. As the first short needle butt travels over cam 52 it engages the notch in the inner end of narrowing cam 71 and causes triangular plate 74 to swing about its pivotal axis until the narrowing cam 70 is disposed in the recess 56 of knitting cam 53 and the narrowing cam 71 is transposed to the position behind guard cam 62 formerly occupied by narrowing cam 70. As the short needle butt engaging the cam 71 follows the ascending motion of said cam it passes onto and over the guard cam 62 and is thus thrown out of operation. As cam 71 reaches guard cam 62 it is forced outwardly by the projection 78 working in cam groove 79 and is thus enabled to continue to its highest position behind cam guard 62. At the next reversal of the cam cylinder during reciprocating knitting the first short needle butt which engages narrowing cam 70 causes the narrowing cams to be returned to the position shown in Fig. 9 and, in so doing, is lifted out of action onto guard cam 62. It will thus be seen that, through the action of the narrowing cams, a short butt needle is thrown out of operation at each reversal of the cam cylinder during the narrowing operation of the reciprocating heel or toe knitting. When the reciprocating knitting is completed the narrowing cam 71 is left in the recess 55 of knitting cam 53 ready to begin the narrowing operation when the motion of the cam cylinder is again changed from rotary to reciprocating.

*Widening mechanism*

Two widening cams 82 and 83 (Figs. 9, 10, 11, 13 and 17 to 25 inclusive) project inwardly through openings 84' in cam cylinder 10. Since these cams are of duplicate design and are mounted and operated in the same manner the following description will suffice for both.

Each widening cam consists of a lug projecting into the cam cylinder from a slide 84 working in a guide groove 85 provided in the inner face of a pivoted cam carrier 86 located outside the cam cylinder and mounted to swing about a pivot 87 which travels with the cam cylinder. Slide 84 is retained in groove 85 by a screw 88 working in a slot 89 in the outer face of the cam carrier. Slide 84 also carries a second stop screw 90 which works in slot in the under face of the cam carrier. Stop screw 90 is engaged by one end of a coiled spring 91 having its other end anchored to the cam carrier. This spring urges slide 84 and the attached widening cam outwardly along the groove 85 to an outer limit position at which the slide is stopped by engagement of stop screw 90 with the outer end of the slot in the under face of the cam carrier.

Cam carrier 86 is connected to one end of a spring 93 having its other end suitably anchored to the cam cylinder. This spring normally holds the cam carrier against a stop 94 carried by the cam cylinder. A pin 95 extends upwardly from the pivoted end of cam carrier 86 in position to be engaged by the bent end 96 of a slide 97 which works in a circumferential groove 98 in the cam cylinder and is operated as hereinafter described.

During the fabric narrowing period of the reciprocating heel or toe knitting the strip 97 is positioned as shown in Fig. 25. In this position of slide 97 the bent end 96 is acting against pin 95 to hold cam carrier 86 in a downwardly swung position away from stop 94. The widening cams 82 and 83 are thus disposed in the inoperative position shown in Fig. 9, that is to say, the widening cams are disposed below the path P of the butts of the needles which are in the raised or inactive position.

At the completion of the narrowing operation slide 97 is shifted to the position shown in Fig. 24. During this shifting of slide 97 the bent end 96 moves away from pin 95 and permits the spring 93 to swing cam carrier 86 upwardly against stop 94. This throws the narrowing cam on the slide 84 up into an operative position to be struck by the butts of the needles which were raised to an inactive position during the narrowing operation.

Each widening cam is formed with a vertical shoulder 100 and a horizontal projection 101 overhanging said shoulder. The projection 101 is made long enough to draw down two needle butts at each needle depressing operation of the widening cam.

When the widening cams are in their operative position and the cam cylinder is turning forwardly during reciprocating heel or toe knitting the butt of the needle thrown up in the preceding stroke together with the butt of the next adjacent needle pass under the horizontal projection 101 of widening cam 82 and act against the shoulder 100 to force said cam downwardly along the groove 85, to a position behind the knitting cam 60. The two underlying needle butts are carried downwardly by the projection 101 and are caused to travel over the inclined end 61a (Fig. 9) of knitting cam 60 to a knitting position beneath said knitting cam. When the needle butts pass out of engagement with widening cam 82 the spring 91 acts to force cam 82 upwardly along groove 85 and thus returns said cam to its operative needle-depressing position in the path of the inactive needle butts. When the motion of the forwardly travelling cam cylinder is reversed two needles are similarly engaged by the widening cam 83 and delivered to a knitting position beneath knitting cam 59.

With the widening cams in operation during reciprocating heel or toe knitting it will be seen that, at each reciprocation of the cam cylinder, two inactive needles are drawn down into action by one of the widening cams while one needle is being raised out of action by one of the narrowing cams. The number of active needles is thus increased by one at each reciprocation of the cam cylinder to widen the fabric.

The foregoing description of the various needle actuating devices carried by the cam cylinder covers the sequential functioning of said devices during full automatic operation of the knitting machine in the production of stockings in which the leg portion of the stocking is formed by rotary knitting and without ornamental pattern effects.

*Mechanism for controlling throw-out cam 64 and throw-in cam 65 during fully automatic knitting of stockings in which the leg portion is formed by rotary knitting without ornamental pattern effects*

An operating cam 102 which acts against throw-out cam 64 and a second operating cam 103 which acts against throw-in cam 65 are rotatably mounted on a post 104 carried by cam cylinder 10. Cams 102 and 103 are integrally joined together and are secured to an underlying ratchet 105 also rotatably mounted on post 104. Ratchet 105 is periodically operated by a pawl 106 which is normally positioned above the path through which the ratchet travels when moving with the cam cylinder.

Figure 6:
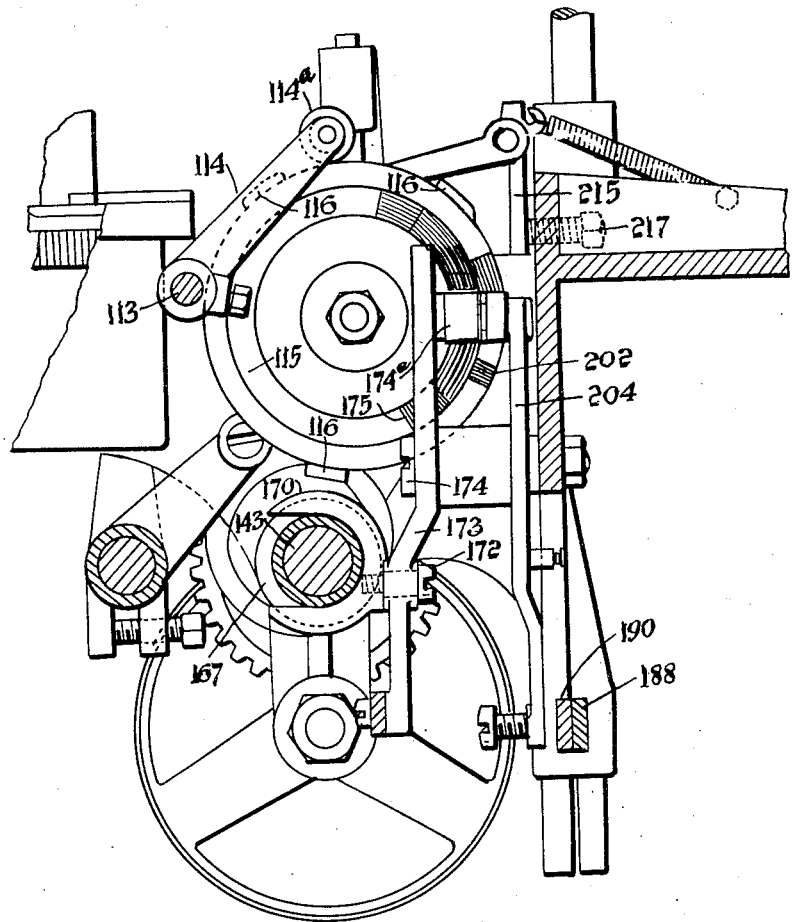
Fig. 6 is a transverse sectional view showing the main cam disk and cooperating cam levers.

Pawl 106 (Fig. 2) is adjustably mounted on the upper end of a pin 107 with the ratchet engaging end of the pawl directed toward the cam cylinder. Pin 107 slides in a vertical slotted bearing 108 carried by the machine frame. A spring 109 is arranged in the lower portion of bearing 108 and normally holds pin 107 in an elevated position in which the ratchet engaging end of pawl 106 is disposed above the ratchet. Pin 107 carries a screw 110 working in a vertical slot in bearing 108. The shank of screw 110 is engaged in a slot 111 in the free end of a forwardly extending lever arm 112 secured to a shaft 113. A second lever arm 114 extends rearwardly from shaft 113 and is provided at its free end with a roller 114a which rides the periphery of a rotary cam disk 115 in the path of a series of cams 116 (Fig. 6) carried by the disk. Each time a cam 116 passes beneath roller 114a the pin 107 is depressed to lower pawl 106 to a ratchet operating position in the path of ratchet 105. As soon as the operating cam 116 passes out of engagement with roller 114a the pawl 106 is returned to its normal inoperative position by spring.

The first operation of ratchet 105 by pawl 106 advances the ratchet the distance of one tooth and causes cam 102 to project throw-out cam 64 into the cam cylinder to throw out of action the long butt needles which are not used in the reciprocating knitting of the heel and toe.

A second operation of ratchet 105 by pawl 106 occurs when the narrowing operation of the automatic reciprocating knitting is completed and causes the widening cams to be thrown into operation by ratchet controlled mechanism hereinafter referred to. During this second operation of the ratchet the cam 102 is turned to permit cam 64 to be returned to its inoperative position by spring arm 66.

A third operation of ratchet 105 by pawl 106 occurs at the end of the widening operation as the motion of the cam cycle is changed from reciprocating to rotary. This third operation of the ratchet causes cam 103 to project the throw-in arm 65 into the cam cylinder to return to action the long butt needles together with any of the short butt needles which are in a raised non-knitting position at the end of the widening operation.

As the motion of the cam cylinder changes from reciprocating to rotary the third operation of ratchet 105 is immediately followed by a fourth operation which causes cam 103 to be turned to a position permitting return of throw-in cam 65 to inoperative position by spring arm 67. This fourth operation of the ratchet also results in the widening cams being thrown out of operation as hereinafter described.

*Ratchet controlled mechanism for operating widening cams*

A pair of superimposed cam disks 118 (Figs. 17 to 20) are mounted on top of cam 102 and are suitably secured to turn with said cam in response to operation of ratchet 105. Each cam disk 118 is provided with a segmental rib 119. The lower cam disk 118 rests directly on the top of cam 102 and the upper cam disk 118 rests directly on the rib 119 of the lower disk. These cam disks 118 operate upper and lower cam straps 120 which are attached to the adjacent ends of the two widening cam operating slides 97. The lower cam strap 120 is fitted between the two cam disks 118 and is provided with an opening 121 in which the rib 119 of the lower cam disk operates. The upper cam strap 120 is supported on the upper cam disk 118 and is provided with an opening 121 in which the rib 119 of the upper cam disk operates. A retaining washer 123 overlies the upper cam disk and is held in place by a nut 124 on the upper end of post 104.

The opening 121 of each cam strap 120 is shaped to provide diametrically opposite inwardly directed projections 125 and 126. The ribs 119 of cam disks 118 are normally engaged with the projection 125 of cam straps 120 and serve to hold the slides 97 in the position shown in Fig. 25. In this position of slides 97 the widening cams are held out of action by the bent ends 96 of the slides. When cam disks 118 are through half a revolution the cam disk ribs 119 engage the projections 126 of the cam straps and shift the slides 97 to the position shown in Fig. 24, thus permitting the widening cams to be thrown into operation by the springs 93.

As previously indicated the shifting of the slides 97 to throw the widening cams into operation takes place during the second operation of ratchet 105 which occurs at the end of the narrowing operation. The subsequent reverse shifting of slides 97 to permit the widening cams to be thrown out of operation by springs 93 takes place during the fourth operation of ratchet 105 as the motion of cam cylinder 10 is changed from reciprocating to rotary.

*Motion changing mechanism*

Figure 2:
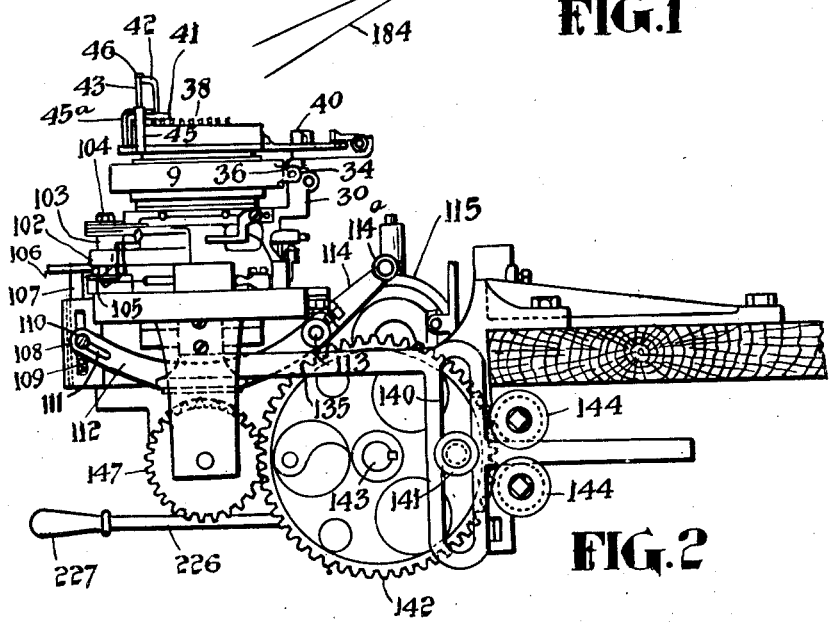
Fig. 2 is a side view of the opposite side of the machine shown in Fig. 1.
Figure 3:
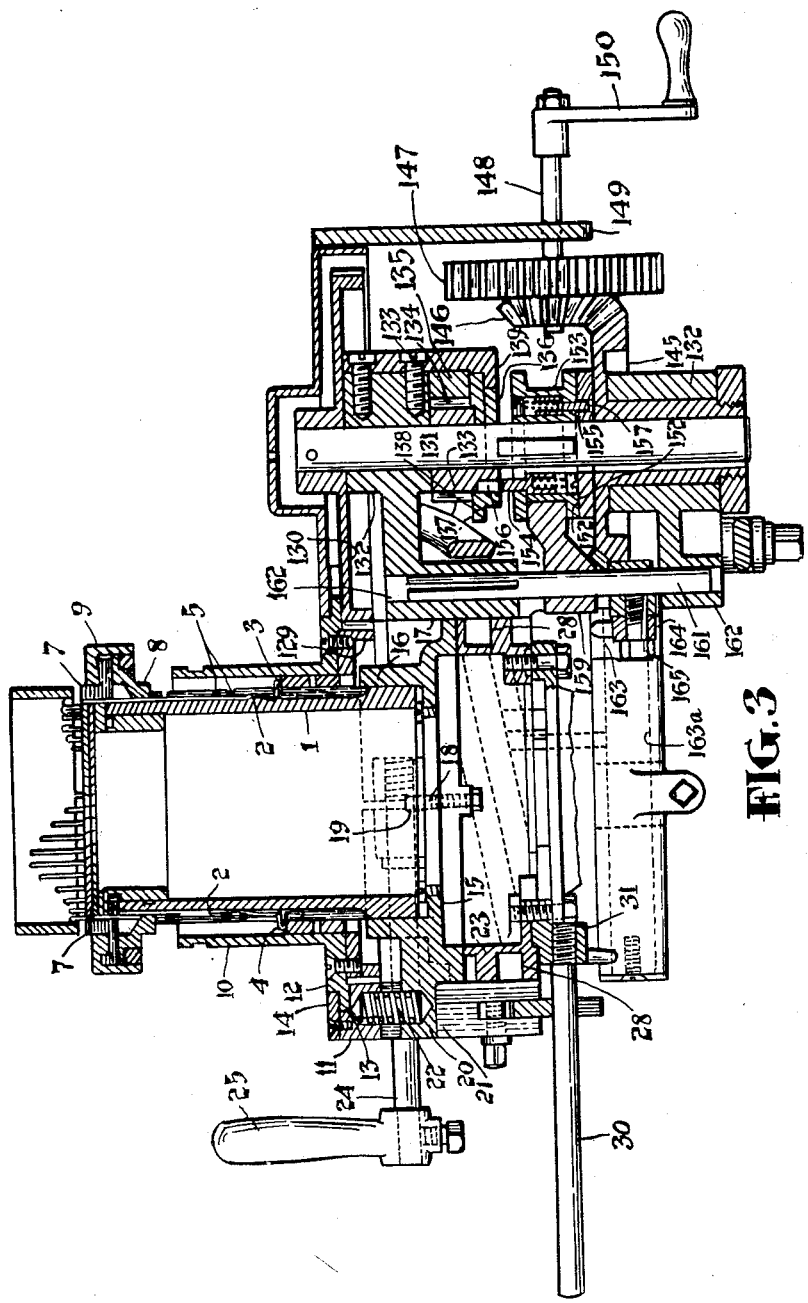
Fig. 3 is a vertical sectional view of the knitting head and clutch assembly.

The mechanism for changing the motion of cam cylinder 10 from rotary to reciprocating and vice versa includes a gear 129 (Fig. 3) secured to cam cylinder 10 and meshing with a gear 130 securing to the upper end of a vertical clutch shaft 131 journalled in suitable bearings 132. An oscillating pinion 133 is loosely mounted on the upper portion of clutch shaft 131 beneath gear 130 and is driven by rack teeth 134 formed on a reciprocating rack bar 135. A collar 136 is secured to pinion 133 and is provided with a flange 138 engaging a supporting plate 139. The rack portion of rack bar 135 is guided and held in operative relation to pinion 133 by a vertical portion of plate 139 which is attached to the upper clutch shaft bearing 132. An intermediate portion of rack bar 135 is provided with a transverse slot 140 (Fig. 2). A crank pin 141 carried by a spur gear 142 secured to main drive shaft 143 works in slot 140 and serves to impart the reciprocating movement to the rack bar. The portion of the rack bar which extends rearwardly from slot 140 is guided by upper and lower guide rolls 144. A bevel gear 145 (Figs. 2 and 3) is loosely mounted on the lower portion of clutch shaft 131 in mesh with a bevel gear 146 formed on a spur gear 147 which is directly driven by the spur gear 142 on main drive shaft 143. Gear 147 is secured to the inner end of a horizontal shaft 148 journalled in a suitable bearing 149. An operating crank 150 is detachably secured to the outer end of shaft 148 to provide for manual operation of said shaft.

A clutch 152 is slidably keyed to clutch shaft 131 between pinion 133 and bevel gear 145. This clutch is provided with an annular groove 153 and two spring projected pins 154 and 155. Pin 154 projects above the clutch and enters a pin hole 156 in the collar 136 of oscillating pinion 133 when the clutch is shifted to its uppermost position to change the motion of the cam cylinder from rotary to reciprocating. Pin 155 projects below the clutch and enters a pin hole 157 in bevel gear 145 when the clutch is shifted to its lowermost position to change the motion of the cam cylinder from reciprocating to rotary.

Clutch 152 is shifted on clutch shaft 131 by a clutch shifting arm 159 having a forked end 160 fitted in the clutch groove 153. The other end of arm 159 is secured to the intermediate portion of a vertical slide rod 161 having its ends slidably fitted in suitable bearings 162.

The lower portion of slide rod 161 is secured, by collar 164 (Figs. 3 and 7) and pivot screw 165, to the forward end of a cam-actuated clutch-shifting lever 163 intermediately pivoted on a stud 163a carried by the frame. The rear end of lever 163 is bifurcated to provide upper and lower cam engaging arms 165 and 166 (Fig. 4) which straddle the main drive shaft 143 and are relatively offset to lie in different vertical planes. These arms 165 and 166 are alternately engaged by a shiftable cam 167 slidably keyed to main driving shaft 143.

Figure 4:
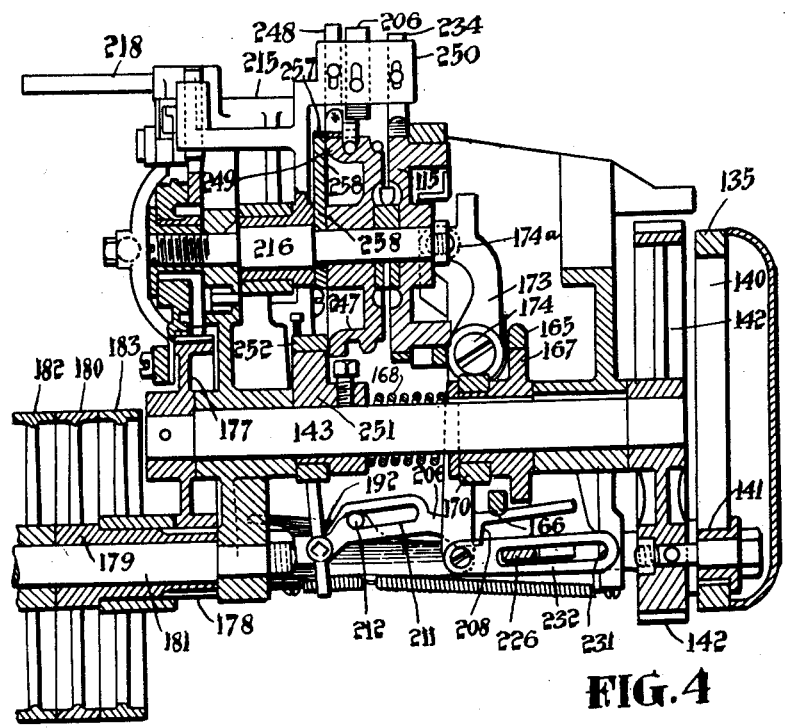
Fig. 4 is a vertical sectional view showing the main shaft and parts associated therewith.

A spring 168 normally holds cam 167 in the position shown in Fig. 4. In this position cam 167 acts against arm 165 of clutch shifting lever 163 to depress the front end of said lever and thereby shift clutch 152 downwardly to establish a drive connection between clutch shaft 131 and the continuously rotating bevel gear 145.

The motion of the cam cylinder is changed from rotary to reciprocating by shifting cam 167 to the left from the position shown in Fig. 4 to a position in which the cam acts against the arm 166 of clutch shifting lever 163 to raise the front end of said lever and thereby shift clutch 152 upwardly to establish a drive connection between clutch shaft 131 and oscillating pinion 133.

Figure 7:
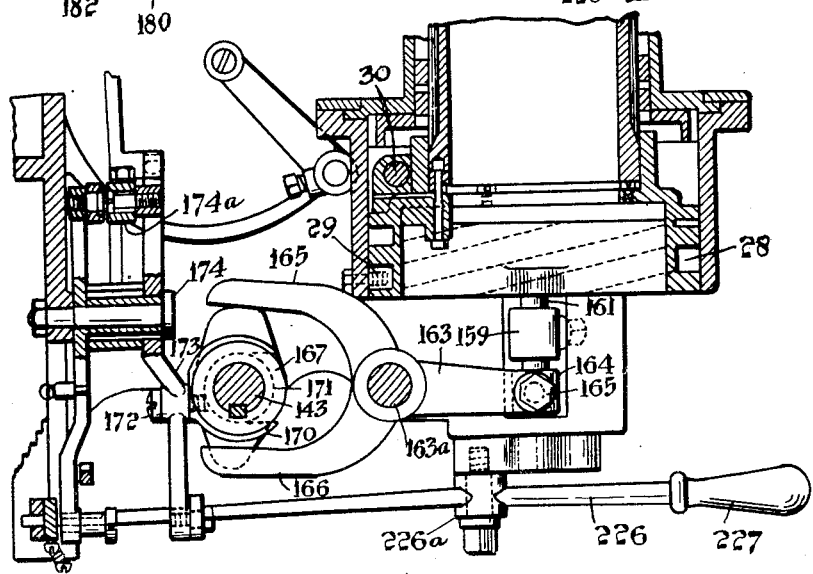
Fig. 7 is a sectional view showing the mounting of the knitting head and the cam-operated clutch shifting mechanism.
Figure 14:
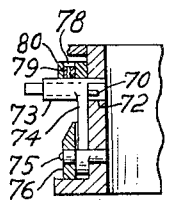
Figure 16:
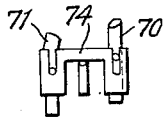
Figure 15:
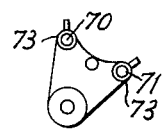
Figure 13:
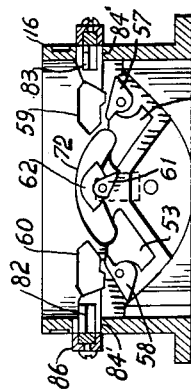
Figure 10:
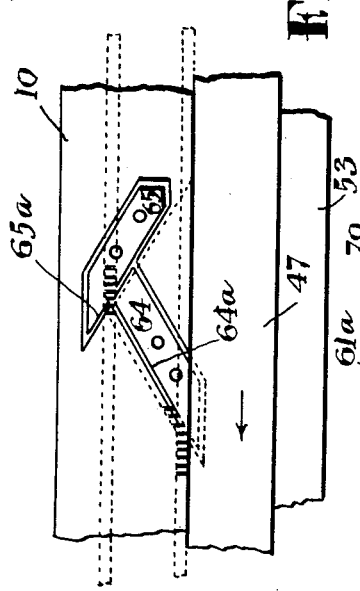
Fig. 10 is a view similar to Fig. 9 but showing the throw-in and throw-out cams.

The cam 167 is provided with two clutch-shifting projections as shown in Fig. 7 and is shifted at a time when these projections are positioned to pass under the arm 165 or over the arm 166.

A cam shifting yoke 170 (Figs. 4 and 6) is fitted in groove 171 of cam 167 and is pivotally secured by pivot screw 172 to the lower portion of a lever 173. This lever 173 is intermediately pivoted to a stud 174 and is provided at its upper end with a roller 174a which is positioned in the path of a cam lift 175 projecting from one side of the previously mentioned cam disk 115. When cam lift 175 passes under roller 194a the lever 173 is actuated to shift clutch controlling cam 167 to the left against the resistance of spring 168.

*Speed changing mechanism*

The cam cylinder is rotated at a relatively high speed during rotary knitting and at a slower speed during reciprocating knitting. The speed changing mechanism provided for this purpose includes a gear 177 (Fig. 4) secured to the end of main shaft 143 remote from gear 142. Gear 177 is directly driven by a pinion 178 formed on the hub 179 of a pulley 180 which revolves on a stationary shaft 181 carried by the frame. Pulley 180 is positioned between an outside idler pulley 182, rotatably mounted on shaft 181 and an inside idler pulley 183 rotatably mounted on the hub of pulley 180.

Pulley 180 is driven by a fast belt 184 (Fig. 8) during rotary knitting and by a slow belt 185 during reciprocating knitting. When the fast belt 184 is on pulley 180 during rotary knitting the slow belt 185 is on idler pulley 183. When the slow belt 185 is on pulley 180 during reciprocating knitting the fast belt 184 is on idler pulley 182. The machine is stopped by shifting the active belt onto its idler pulley. Belt 184 is shifted by the forked end or fork 187 of a belt shifting slide or shifter 188 and belt 185 is shifted by the forked end or fork 189 of a second belt shifting slide or shifter 190. The two belt shifting slides or shifters 188 and 190 are connected by a spring 191 which tends to throw shifter 188 to the left and shifter 190 to the right. Shifter 188 carries a latch 192, pivoted at 192a and having a shoulder 193 engaging an abutment afforded by a pin 194 which is carried by shifter 190 and projects through a slot 195 in shifter 188. When latch 192 is engaged with pin 194 the spring 191 is under tension and the two belt shifters are connected so that they move together with the forks 187 and 189 so that one of the belts 184 or 185 is on the pulley 180 and the other is on its loose pulley. When latch 192 is disengaged from pin 194, spring 191 causes shifter 188 to move to the left or the shifter 190 to move to the right, thus throwing the then active belt onto its loose pulley without shifting the idler belt. Shifter 188 is provided with a stop 197 for limiting its movement towards the left, and shifter 190 is provided with a boss 198 for limiting its movement to the right.

Figure 5:
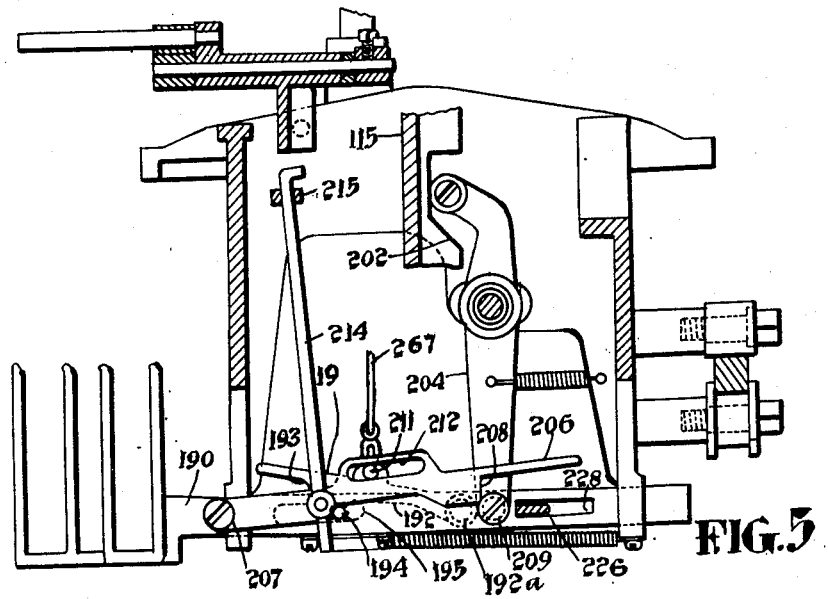
Fig. 5 is a vertical sectional view showing component parts of a belt shifting mechanism.

The connected shifters 188 and 190 are moved toward the right by a spring 201 connected to shifter 188 and to the frame of the machine. The connected shifters are moved to the left against the tension of spring 201 by a cam 202 (Figs. 5 and 6) carried by cam disk 115 and arranged to act against the upper end of a lever 204 pivoted on the stud 174 and having its lower end connected with the shifter 190. With this construction of mechanism for operating the shifters the shifter 190 is held by the cam in its left-hand position and would not be shifted to the right by spring 191 when the shifters are disconnected unless the connections between the cam and shifter were broken. The end of lever 204 is therefore preferably connected to the shifter 190 by a latch 206, (Figs. 4 and 5) pivoted at 207 to the shifter 190 and having a shoulder 208 arranged to engage a pin 209 on the end of lever 204. The latches 192 and 206 are preferably connected by a pin 211, projecting from latch 192 through a slot 212 in latch 206 so that said latches may be simultaneously lifted to disconnect the shifters and break the connections with the operating cam. The latches in the construction shown are connected by a rod 214 with a frame 215 (Figs. 4, 5, and 33), pivoted on the hub of a pawl-carrier to be described, which in turn is pivoted on a stud 216 secured in the frame, Fig. 4. The frame 215 normally rests against a stop 217, Fig. 6, and is provided with a laterally projecting rod 218, forming a handle by which said frame may be rocked to lift the latches and stop the machine. The frame 215 may be automatically rocked to stop the machine by means of an arm or lever 219 loosely pivoted on a shaft 220, mounted in said frame, said arm extending forward and resting upon a pattern-chain 221, Figs. 33 and 35. The arm 219 is provided with a shoulder 222 near its forward end, which is so arranged that when the arm is raised by a lug 223 on the pattern-chain said shoulder is brought into the path of a reciprocating pawl 225, which draws said arm forward thus rocking frame 215 and stopping the machine. The machine may be started by a lever 226 (Figs. 5 and 7), pivoted at 226a and having a handle 227 at the front of the machine and having its rear end passing through slots 228 and 229 in the shifters 190 and 188, respectively.

Figure 8:
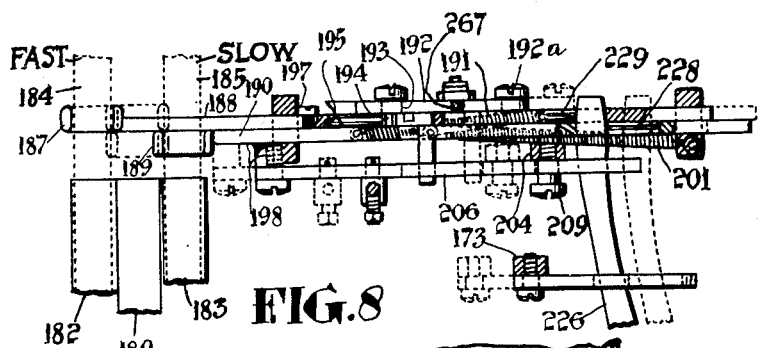
Fig. 8 is a detail view of the belt-shifting mechanism.

Supposing the parts to be in the position shown in Fig. 8, which is the position they would occupy when the machine is stopped on rotary knitting, then by swinging the front end of lever 226 to the left the rear end of said lever will be caused to act against the right end of slot 229 and move shifter 188 to the right, carrying the fast belt 184 onto pulley 180 and bringing latch 192 into engagement with pin 194. If the machine is stopped when the slow belt 185 is on pulley 180 in which case the lower end of lever 204 will be in the dotted line position, Fig. 8, then by swinging the front end of lever 226 to the right the rear end is caused to engage the left end of slot 228 and force shifter 190 to the left and engaging latch 192 and also bringing latch 206 into position to engage lever 204. When the machine is in condition for reciprocating knitting, the fast belt should not be shifted onto the driving pulley and means are therefore provided for preventing such movement of the fast belt. This means preferably consists of a stop carried by the lever which controls the position of the clutch, which stop is arranged to prevent the movement of the rear end of the lever toward the right when the clutch is in engagement with the oscillating pinion. This stop is formed by the end of a slot 231 (Fig. 4) formed in an arm 232 secured to the end of lever 173 through which slot the lever 226 passes.

The cam or controller disk 115, which carries the cams for controlling the speed and motion changing mechanisms, and the cams for controlling the operation of the needles, is mounted on the stud 216 and is driven by the action of a reciprocating pawl 234 arranged to engage ratchet teeth formed on said disk. In the machine illustrated the disk is provided with twelve teeth, Fig. 34, every fourth one of which is a long tooth, forming a dwell on which the operating pawl rides idly until the disk is advanced far enough to allow the pawl 234 to engage said tooth. The disk is given this advance movement at the proper times by pins or projections 236, carried by the pattern-chain and arranged to engage abutments on the cam-disk, said disk having three such abutments corresponding to the number of long teeth or dwells thereon. These abutments are preferably formed by arms or levers 237, pivoted to the disk 115 and arranged to engage a cam 238 which is mounted in a ring 239, secured to the stud 216. The cam 238 is so arranged that the arm 237, corresponding with the teeth on which the pawl 234 is working, is held up in the path of the projection 236 on the chain 221. The other arms are held against the ring 239 by springs 241 so that they cannot strike any succeeding projection 236 and feed the pattern-chain forward improperly. The outward swing of the arms is limited by pins 243. When a projection 236 strikes the arm 237, which rests on the cam 238, the disk 115 is advanced so that the long tooth is engaged by pawl 234 and the disk 115 is then advanced step by step until the next long tooth is brought under the pawl. The disk now remains at rest until another projection 236 on the chain again starts the disk, when it is again fed forward a third of a revolution. In order that the pattern-chain may be run backward when desired without the inconvenience of lifting each of the projections 236 over the arm 237, which is on the cam 238, said cam is held yieldingly in position, so that it may yield when a projection 236 strikes the back of an arm 237 and allow said projection to pass said arm. As shown, the cam 238 is formed on a plunger mounted in the ring 239 and supported by a spring 245.

The pattern-chain 221 passes over a spocket wheel 247, mounted on stud 216, and said chain is fed forward by a pawl 248, which engages a ratchet wheel 249, formed on said sprocket-wheel. The pawl 248 is mounted in a pawl-carrier 250, mounted upon the stud 216. The pawl-carrier is oscillated continuously by an eccentric 251 secured to the shaft 143 and carrying an eccentric-strap 252, the other end of which is pivoted to the lower end of the pawl-carrier, Fig. 33. The pawl 248 is mounted to slide vertically in the pawl-carrier, being guided by a screw 254, working in a slot 255. For the greater part of its travel the pawl rides on a shiftable shield 257, (Figs. 4, 37 and 38) adjustably mounted on a plate 258, secured to stud 216, the travel of the pawl beyond the end of the shield being just sufficient to advance the ratchet one tooth. The pawl-carrier 250 also carries the pawls 225 and 234 which are mounted in a similar manner to pawl 248.

General plain knitting operation

The general operation of the machine during plain knitting is as follows: During rotary knitting the parts are in the position shown, with the exception that the belt-shifters are locked together and the fast belt is on the pulley. When the machine is to pass onto the heel or toe, one of the pins 236 on the pattern-chain strikes an arm 237 and starts the disk 115, bringing the long tooth into position to be engaged by the pawl 234. The disk is now fed forward four teeth. During the first forward movement the cam 202 shifts the slow belt onto the pulley 180, thus reducing the speed of the machine. During the second movement the cam 175 shifts the cam 167, thus changing the motion of the cam-cylinder from rotary to reciprocating and one of the cams 116 shifts the pin 107 to cause the instep-needles to be thrown out of operation. During the third movement the lever arm 114 runs off of the cam 116 and the pin 107 returns to normal position, and the fourth forward movement brings the second long tooth under the pawl 234. The disk 115 now remains stationary until the narrowing operation is completed. Then it is again started in a similar manner and moved four steps forward. No operation is performed during the first and second movements; but the third movement brings the second cam 116 under lever 114 and shifts the pin 107 to cause the widening devices to be thrown into action, and the fourth movement carries cam 116 from under lever 114 and also brings the third long tooth under pawl 234. The disk 115 now remains stationary until the heel or toe is completed, when it is again started and fed four steps forward. The first and second movements are idle movements. During the third movement the third cam 116 shifts the pin 107 to cause the widening devices to be thrown out of action and the instep-needles to be thrown into action, the roll 174a of lever 173 passes off of the end of cam 175, thus causing the clutch to be shifted from the oscillating to the rotary pinion. During the fourth movement the cam 116 moves from under lever 114, thus restoring pin 107 to its normal position. The end of lever 204 passes off of the cam 202, thus shifting the fast belt onto pulley 180 and the first long tooth is again brought under the pawl 234. The machine continues on rotary knitting until another heel or toe is to be formed, when the same cycle of operation is again performed.

Figure 1:
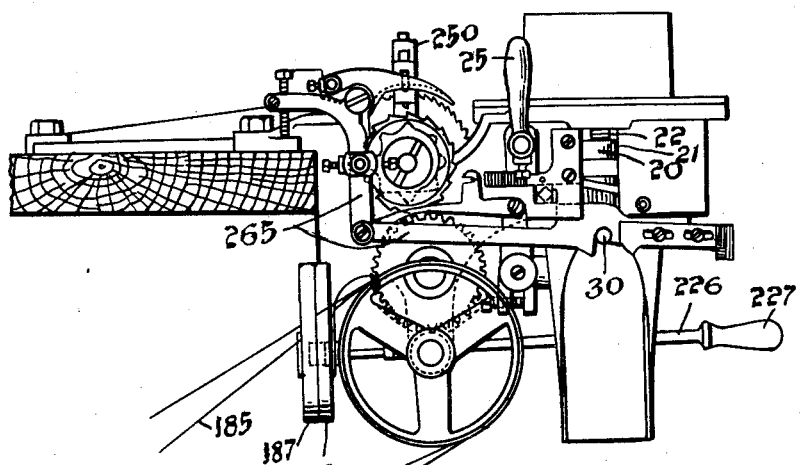
Fig. 1 is a side view of a knitting machine embodying my invention.

The mechanism generally indicated at 265 (Fig. 1) is an automatic mechanism for operating rod 30 to raise the needle cylinder 1 to vary the length of the stitcher drawn by the needle. This mechanism is not described in detail since it does not enter into the present invention and is fully set forth in U. S. Patent No. 806,921.

The foregoing description covers the automatic operation of the machine in the knitting of plain-leg stockings. As hereinafter set forth, the machine may also be used as a semi-automatic pattern knitting machine for making diamond patterns during the knitting of the leg portions of men's socks or half hose. In the latter use of the machine, a desired number of courses, forming the upper part of the leg portion, are formed by automatic rotary knitting. As these courses are completed, the frame 215 is automatically rocked by a lug 223 on the pattern chain to stop the machine. As previously explained, this rocking of frame 215 acts through rod 214 to lift the latches 192 and 206 so that the fast belt is shifted onto the idler pulley and the machine comes to rest.

The raising of latch 192 acts through a rod 267 (Figs. 5, 8, 37 and 28) to shift the previously mentioned shield 257 over the ratchet wheel 249 to a position such that the pawl 248 rides on the shield throughout its travel without actuating the ratchet 249. The pattern chain thus remains idle throughout the pattern knitting of the leg portion during which the cam cylinder 10 is operated manually by means of the crank 150 attached to the shaft 148 of spur gear 147 which forms part of the drive connection between the main shaft 143 and the clutch gear 145.

During pattern-knitting of the leg portion the cam cylinder, instead of being rotated continuously as in the automatic knitting of plain leg portions, is reciprocated by means of the crank handle 150 and the widening cams are thrown into and out of action by means of a hand lever 269 having one end mounted to swing about post 104 and a handle 270 at the opposite end. This lever carries a pawl 271 engageable with the ratchet 105 and is normally held in the position shown in Fig. 26 by a spring 272. During pattern knitting of the leg portion, all the needles are used as hereinafter described but the throw-out cam 64 and the throw-in cam 65 are not brought into action.

*General operation during pattern knitting of leg portion (see Fig. 39)*

After the automatic rotary knitting of the preliminary courses A forming the top of the leg portion have been completed and the machine brought to a stop, the vertically moveable rib section 47 of cam cylinder 10 is raised by its lifting pins 47a to lift one half of the needles out of action. The cam cylinder is then reciprocated by the handle 150 until a narrowing operation B is completed, by the automatic narrowing cams. The needles used in the first narrowing operation are then raised out of action by lifting rib 47 and are replaced by the second half of the needles which are lowered into action by the needle-depressing plate 41 to effect the narrowing operation C. The second group of needles is then raised out of action and replaced by the first group and the lever 269 is operated to move ratchet 105 the distance of two teeth to bring the widening cams into operation. The cam cylinder is then reciprocated by hand until the diamond-forming widening operation D is completed. Then, while leaving the same group of needles in knitting position, the lever 269 is again operated to move the ratchet 105 the distance of two teeth to throw the widening cams out of action. The cam cylinder is then reciprocated until a diamond-completing narrowing operation E is completed. The needles used in both of the last mentioned narrowing and widening operations are then raised out of action and the diamond-forming narrowing and widening operations F and G repeated in sequence with the other group of needles in the knitting position. This procedure is repeated until the leg portion is completed and provides a leg portion having a diamond pattern.

In the present instance I have described a pattern-knitting procedure in which one-half of the needles are raised out of action at each operation of the lifting rib 47. However, it will be apparent that the number of needles thrown out of action in this way may be varied to provide for the knitting of diamond-patterns of varying size. For example, if more than half of the needles are to be throw nout of action, the cam cylinder may be given a quarter turn after the first raising of rib 47 and the latter may be raised a second time to lift another quarter of the needles out of action. Similarly, if one quarter of the needles are to be raised out of action, this may be taken care of by turning the cam cylinder and operating the needles depressing plate 41 to return to action one half of the group of needles previously lifted out of action by the lifting rib 47.

As the ratchet 105 is moved the distance of two teeth by each operation of lever 169, the throw-out cam 64 and the throw-in cam 65 are only momentarily projected into the cam cylinder and then immediately withdrawn so that they have no effect on the needles during the pattern knitting of the leg portion.

When the pattern-knitting of the leg is completed, the starting lever 226 is operated to throw the fast belt onto pulley 180 and to return shield 257 to its normal position. The machine then operates automatically to effect rotary knitting of a required number of leg finishing courses. As these leg finishing courses are completed, the reversing clutch is operated automatically to provide for the knitting of the heel, toe, and foot in the manner previously described.

I claim:

1. In a circular knitting machine of the character described, a cam cylinder provided with an arcuate levelling rib on which the needle butts ride when the needles are in their lowermost knitting position and with needle actuating cams including a throw-in cam, a throw-out cam, narrowing cams and widening cams, said rib including a vertically movable needle-raising section for repeatedly raising different groups of the needles out of action during knitting operations in which the throw-in and throw-out cams are not employed and means for returning to action each group of needles which is thrown out of action by said needle-raising rib section.

2. A knitting machine as set forth in claim 1, in which the last mentioned means comprises a vertically movable needle-depressing plate arranged to act against the upper ends of the needles.

3. A knitting machine as set forth in claim 1, including lifting members carried by the needle-raising rib section and projecting outwardly through vertical slots in the cam cylinder and resilient biasing means normally serving to yieldingly hold said needle-raising rib section in its lowermost position.

4. A knitting machine as set forth in claim 1, in which the last mentioned means comprises a guard ring pivoted to the cam cylinder and a needle-depressing plate movably carried by said ring.

5. In a circular knitting machine of the character described, a cam cylinder provided with a levelling rib on which the needle butts ride when the needles are in their lowermost position and with a plurality of needle actuating cams including a throw-in cam, a throw-out cam, narrowing cams and widening cams, said rib including a manually operable vertically movable needle-raising section for repeatedly raising different groups of the needles out of action during semi-automatic leg knitting operations in which the throw-out and throw-in cams are not employed and in which the cam cylinder is reciprocated manually, said narrowing cams being arranged to operate automatically during reciprocation of the cam cylinder, manually operable means for throwing the widening cams into and out of action during manual reciprocation of the cam cylinder, power driven means for imparting rotary and reciprocating movements to the cam cylinder to form the heel, toe and foot portions of the stocking following the semi-automatic knitting of the leg portion, and means for automatically controlling the action of the throw-in cam, the throw-out cam and the widening cams during the aforesaid knitting of the heel, toe and foot portions.

6. In a knitting machine of the character described, a cam cylinder, a levelling rib on which the butts of the needles rest when the needles are in their lowermost position, said rib including a vertically movable needle-raising section operable to repeatedly raise different groups of needles out of action during certain knitting operations, biasing means normally serving to yieldingly hold said needle-raising rib section in its lowermost position and to return said needle-raising rib section to said lowermost position after each needle-raising operation thereof, needle depressing means for returning to action each group of needles raised by said needle-raising rib section, a plurality of knitting cams carried by the cam cylinder including a throw-in cam, a throw-out cam, widening cams and automatic narrowing cams, a ratchet wheel, means operable in response to step-by-step rotation of the ratchet wheel to alternately throw the throw-in and throw-out cams into and out of action, means operable in response to rotation of said ratchet wheel to throw the widening cams into and out of action, a drive shaft, a pattern chain, pawl and ratchet driving mechanism for driving the pattern chain from said power shaft and means controlled by said pattern chain for alternately rotating and reciprocating the cam cylinder and effecting a step-by-step rotation of said ratchet wheel to automatically control the action of said throw-in cam, throw-out cam and widening cams, manually operable means for reciprocating said cam cylinder and operating said ratchet wheel during pattern knitting operations in which the pattern chain is idle and means for rendering the pawl and ratchet driving connection between the driving connection and the pattern chain inoperative during the knitting operation in which the cam cylinder and said ratchet wheel are operated manually.

7. A knitting machine as set forth in claim 6, in which the last mentioned means comprises a shield interposed between the pawl and the ratchet elements of said pawl and ratchet mechanism so that the pawl normally rides on said shield during a part of its working stroke and means for shifting said shield relative to said pawl and ratchet wheel to a position in which the pawl rides on the shield throughout the length of its working stroke and is prevented from engaging and driving said ratchet.

ALBERT ROY ELLIS.

REFERENCES CITED

The following references are of record in the file of this patent:

UNITED STATES PATENTS

| Number | Name | Date |
|---|---|---|
| 570,059 | Rowe | Oct. 27, 1896 |
| 806,921 | Rowe | Dec. 12, 1905 |
| 2,260,650 | Allen | Oct. 28, 1941 |